United States Patent
Lu

(10) Patent No.: US 8,239,679 B2
(45) Date of Patent: Aug. 7, 2012

(54) AUTHENTICATION METHOD, CLIENT, SERVER AND SYSTEM

(75) Inventor: Shan Lu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 335 days.

(21) Appl. No.: 12/621,625

(22) Filed: Nov. 19, 2009

(65) Prior Publication Data

US 2010/0070766 A1 Mar. 18, 2010

Related U.S. Application Data

(63) Continuation of application No. PCT/CN2008/070617, filed on Mar. 28, 2008.

(30) Foreign Application Priority Data

Jun. 28, 2007 (CN) .......................... 2007 1 0109500

(51) Int. Cl.
*H04L 29/06* (2006.01)

(52) U.S. Cl. ........ 713/168; 713/169; 713/170; 713/171; 713/186; 726/2; 726/3; 455/411

(58) Field of Classification Search ........... 713/168–171
See application file for complete search history.

(56) References Cited

U.S. PATENT DOCUMENTS

| | | | | |
|---|---|---|---|---|
| 5,666,415 A * | 9/1997 | Kaufman | ...................... | 713/159 |
| 2003/0126436 A1 * | 7/2003 | Greenberg et al. | ........... | 713/168 |
| 2005/0113070 A1 * | 5/2005 | Okabe | ............................ | 455/411 |
| 2005/0250473 A1 * | 11/2005 | Brown et al. | .................. | 455/411 |
| 2006/0036857 A1 * | 2/2006 | Hwang | .......................... | 713/168 |
| 2007/0067629 A1 * | 3/2007 | Mackenzie et al. | ........... | 713/168 |
| 2007/0186099 A1 * | 8/2007 | Beck et al. | ..................... | 713/159 |
| 2008/0046740 A1 * | 2/2008 | Narayanan et al. | ........... | 713/176 |
| 2008/0301435 A1 * | 12/2008 | Simon | ........................... | 713/155 |
| 2010/0257362 A1 * | 10/2010 | Ramzan et al. | ............... | 713/168 |

FOREIGN PATENT DOCUMENTS

| | | |
|---|---|---|
| CN | 1610290 A | 4/2005 |
| CN | 101075874 A | 11/2007 |
| WO | 2004/010636 A1 | 1/2004 |

OTHER PUBLICATIONS

International Search Report for International Application No. PCT/CN2008/070617, dated Jul. 10, 2008.

* cited by examiner

*Primary Examiner* — Philip Chea
*Assistant Examiner* — Dorianne Alvarado David

(57) ABSTRACT

An authentication method, which includes: a server sends a challenge to a client; the client obtains a first key performs a transformation on the first key utilizing a local hash function to obtain a third key, encrypts the first key and the challenge utilizing the third key to obtain a ciphertext, and sends the ciphertext to the server; the server decrypts the ciphertext utilizing a second key stored locally, obtains a decrypted first key and a decrypted challenge if the second key is the same as the third key, performs a transformation on the decrypted first key utilizing a local hash function to obtain a fourth key, the client passes the authentication if the decrypted challenge and the fourth key are respectively the same as the challenge sent by the server and the second key stored locally by the server.

15 Claims, 4 Drawing Sheets

AUTHENTICATION METHOD, CLIENT, SERVER AND SYSTEM

CROSS-REFERENCE TO RELATED APPLICATIONS

This application is a continuation of International Application No. PCT/CN2008/070617, filed on Mar. 28, 2008. This application claims the benefit and priority of Chinese Application No. 200710109500.9, filed Jun. 28, 2007. The entire disclosures of each of the above applications are incorporated herein by reference.

FIELD

The present disclosure relates to identity authentication technologies, and more particularly, to an authentication method, a client, a server and a system.

BACKGROUND

This section provides background information related to the present disclosure which is not necessarily prior art.

With the development of Internet technologies, people may use the Internet to engage in a variety of operations, in which many of the operations require user authentication. For example, when a user using Internet bank site to perform operations on bank account, it is necessary for the bank site to perform identity authentication on the user requesting operations, so as to ensure security of network operations.

To solve the issue of identity authentication on the Internet, there have been some client devices in the form of USB-KEY device. The USB-KEY device adopts a USB interface to connect with a computer, and interact with the server via the Internet, so as to complete the process of user identity authentication.

The prior USB-KEY authentication technologies may be divided into two categories based on whether a key stored in a USB-KEY device is consistent with another key stored in a server. The first category is referred to as unsymmetrical USB-KEY technologies, in which the key stored in the USB-KEY device is different from the key stored in the server, that is, the key stored in the USB-KEY device is a private_key, while the key stored in the server is a public_key. The other category is referred to as symmetrical USB-KEY technologies, in which the key stored in the USB-KEY device is consistent with the key stored in the server.

When adopting the unsymmetrical USB-KEY technologies, if the public_key stored in the server has been leaked due to the leakage of a database in the server, other people still cannot copy user's private_key due to the fact that the private_key cannot be calculated through the public_key, which to some extent ensures the security of interaction between the USB-KEY device and the server. However, from another aspect, because the unsymmetrical encryption algorithms adopted by the unsymmetrical encryption technologies, such as public-key cryptography algorithm (RSA), Elliptical Curve Cryptography (ECC) are very complicated, it is necessary to adopt special chips so as to complete calculation timely. However, the special chips are very expensive, which results in that the costs for applying the unsymmetrical USB-KEY technologies is relatively high, and subsequently it is difficult to promote the use of the unsymmetrical USB-KEY technologies.

In order to reduce costs, the industry has put forward the symmetrical USB-KEY technologies. Compared with the unsymmetrical USB-KEY technologies, complexity of the symmetrical encryption algorithms adopted by the symmetrical USB-KEY technologies, such as Data Encryption Standard (DES), Tiny Encryption Algorithm (TES), etc, is lower. These symmetrical encryption algorithms may be implemented using general computing devices, and subsequently the costs thereof may be reduced. However, since the key stored in the USB-KEY device is the same as another key stored in the server, once the key stored in the server has been leaked, other people may utilize the leaked key to impersonate the authorized user to perform network operations, thus the security may be greatly reduced.

SUMMARY

This section provides a general summary of the disclosure, and is not a comprehensive disclosure of its full scope or all of its features.

In view of above, embodiments of the present invention provide an authentication method, which may reduce usage costs while ensuring security. Embodiments of the present invention also provide a client, a server and a system.

According to the above objections, embodiments of the present invention provide an authentication method, in which a server stores a second key, the method also includes the following blocks:

sending a challenge to a client by the server;

obtaining a first key by the client;

performing a transformation on the first key utilizing a local hash function to obtain a third key by the client;

encrypting the first key and the challenge utilizing the third key to obtain a ciphertext by the client; and sending the ciphertext to the server by the client;

decrypting the ciphertext utilizing the second key stored locally by the server;

obtaining decrypted first key and decrypted challenge after decrypting the ciphertext, if the second key is the same as the third key by the server;

performing a transformation on the decrypted first key utilizing a local hash function to obtain a fourth key by the server;

passing an authentication of the client, if the decrypted challenge and the fourth key are respectively the same as the challenge sent by the server and the second key stored by the server.

Preferably, the method further includes:

storing an initial key by the client;

performing a transformation on the initial key utilizing a general transformation function to obtain the first key by the client.

Preferably, the method further includes:

storing the first key locally in advance by the client.

The challenge sent by the server to the client includes at least one of: time, a SESSION-ID, random numbers.

The hash function is a message digest algorithm (MD5) or a secure hash algorithm (SHA1).

The server stores the second key locally corresponding to an identifier of the client.

When it is necessary to decrypt the ciphertext, searching for the second key stored locally according to the identifier of the client, and decrypting the ciphertext utilizing the second key.

Embodiments of the present invention also provide a client which is configured for authentication, the client includes the following modules:

a first module, configured to receive a challenge sent by a server, and send a ciphertext coming from a third module to the server;

a second module, configured to store a hash function;

a third module, configured to obtain a first key, perform a transformation on the first key utilizing the hash function coming from the second module to obtain a second key, and encrypt the first key and the challenge received by the first module utilizing the second key to obtain the ciphertext.

The second module in the client is further configured to store an initial key, and the third module is further configured to perform a transformation on the initial key coming from the second module utilizing a general transformation function to obtain the first key.

The second module in the client is further configured to store the first key; and the third module is further configured to obtain the first key from the second module.

The client may be a USB-KEY device.

Embodiments of the present invention also provide a server which is configured for authentication, the server includes the following modules:

a first module, configured to send a challenge to a client, and receive a ciphertext sent by the client;

a second module, configured o store a first key and a hash function;

a third module, configured to decrypt the ciphertext received by the first module utilizing the first key stored by the second module, obtain a decrypted third key and a decrypted challenge if the first key is the same as a second key adopted to encrypt the ciphertext in the client, perform a transformation on the third key utilizing the hash function to obtain a fourth key, determine the client has passed the authentication if the decrypted challenge and the fourth key are respectively the same as the challenge sent by the first module and the first key stored by the second module.

Embodiments of the present invention also provide an authentication system, including a server and a client, in which the client is configured to obtain a first key, perform a transformation on the first key utilizing a locally stored hash function to obtain a second key after receiving a challenge sent by the server, encrypt the first key and the challenge utilizing the second key to obtain a ciphertext, and send the ciphertext to the server;

the server is configured to store a third key, send the challenge to the client, decrypt the ciphertext utilizing the third key stored locally after receiving the ciphertext from the client, obtain a decrypted first key and a decrypted challenge if the third key is the same as the second key, perform a transformation on the decrypted first key utilizing a local hash function to obtain a fourth key, determine the client has passed an authentication if the decrypted challenge and the fourth key are respectively the same as the challenge sent by the server and the third key stored locally by the server.

From the above technical solution, it can be seen that if other people have obtained the second key due to the leakage of the second key stored in the server, the first key in the client still cannot be obtained reversely from the second key because of the unidirection of the hash function. Therefore, the encryption at the client still cannot be achieved only based on the second key without the initial key or the first key. Thus, in accordance with the technical solution in the embodiments of the present invention, no security problem may be occurred even if the key stored in the server has been leaked, and subsequently the security may be ensured. From another aspect, the algorithms needed to be implemented at the client are the general transformation function, the hash function and the symmetrical encryption function. Since these types of algorithms are very simple, they may be completely implemented within a Micro Controller Unit (MCU) built in the client controller chip. The expensive special chips are no longer necessary. Therefore, the technical solution in the embodiments of the present invention may also greatly reduce hardware costs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

To make objectives, technical solutions and advantages of the present invention clearer, detailed descriptions of the present invention are further provided in the following accompanying with embodiments.

Figure 1:
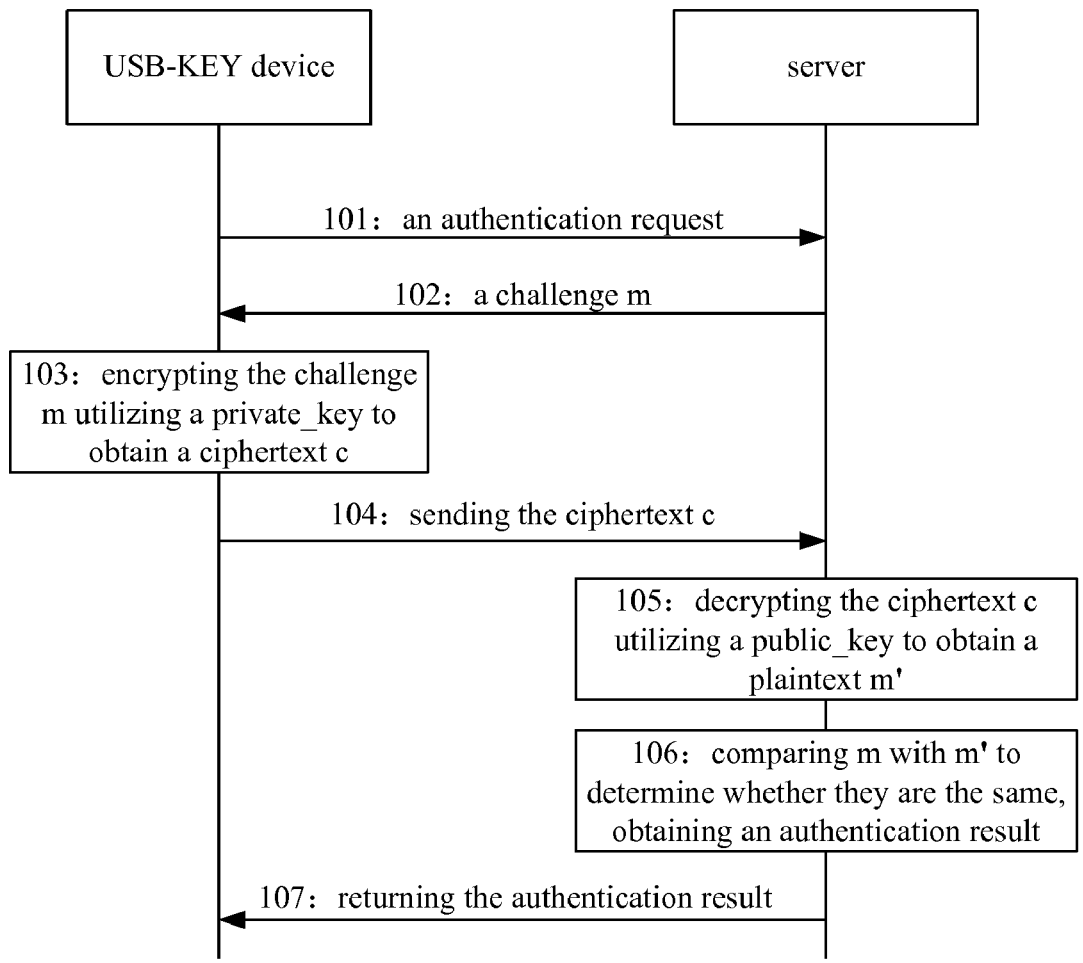
FIG. 1 is a schematic diagram illustrating flow of authentication interaction using asymmetrical USB-KEY technologies in the prior art.

FIG. 1 is a flow chart illustrating authentication interaction between a USB-KEY device and a server using asymmetrical USB-KEY technologies. As shown in FIG. 1, the flow includes the following blocks.

Block 101: the USB-KEY device initiates an identity authentication request to the server via the Internet.

Block 102: after receiving the request, the server sends a challenge m to the USB-KEY device. The challenge m may include time, session-id and some random numbers.

Block 103: the USB-KEY device utilizes locally stored private_key and an asymmetrical encryption algorithm to encrypt the challenge m to obtain a ciphertext c.

If y=E(p1, x) is adopted to demonstrate the encryption function, and x=D(p2, y) is adopted to demonstrate the decryption function, in which p1 and p2 are keys, and then the encryption in the block may be demonstrated by c=E(private_key, m).

Block 104: the USB-KEY device sends the ciphertext c to the server.

Block 105: after receiving the ciphertext c, the server utilizes local public_key to decrypt c, and obtains the decrypted plaintext m'=D(public_key, c).

Block 106: the server compares m with m' to determine whether they are the same. If they are the same, it means that the authentication is successful; otherwise, the authentication is unsuccessful.

Block 107: the server returns a result indicating a successful authentication or an unsuccessful authentication to the USB-KEY device.

When the asymmetrical USB-KEY technologies are adopted, if database in the server is leaked resulting in leakage of the public key stored in the server, other people are not able to copy user's private key due to the fact that the private key cannot be calculated through the public key, which ensures security of interaction between the USB-KEY device and the server to some extent. However, since asymmetrical algorithms, such as public-key cryptography algorithm (RSA), elliptical curve cryptography (ECC), etc, adopted by the asymmetrical encryption technologies are very complicated, it is necessary to adopt special chips so as to complete calculations in time. However, the special chips are more expensive, which results in that the cost of using the asymmetrical USB-KEY technologies is relative high, and use of the asymmetrical USB-KEY technologies are hard to be promoted.

Figure 2:
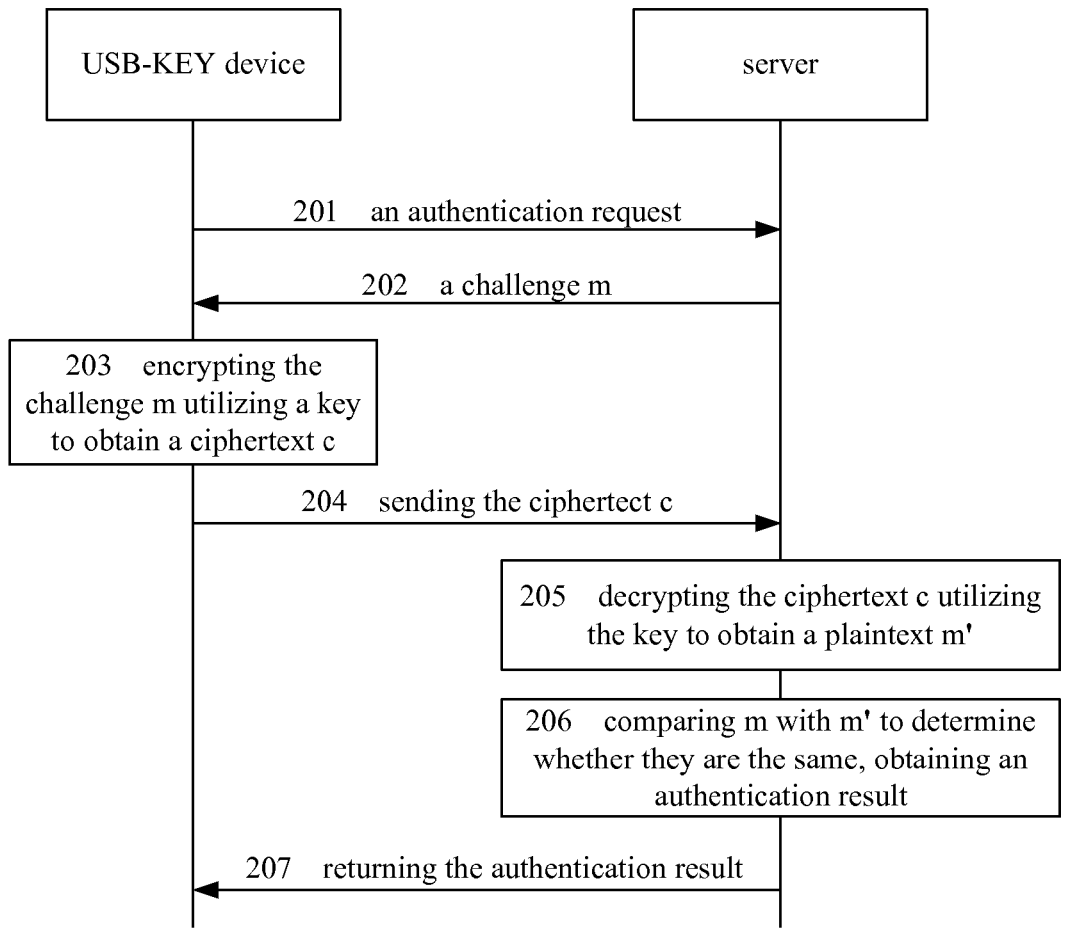
FIG. 2 is a schematic diagram illustrating flow of authentication interaction using symmetrical USB-KEY technologies in the prior art.

To reduce cost, the industry puts forward the symmetrical USB-KEY technologies. FIG. 2 is a flow chart illustrating authentication interaction between a USB-KEY device and a server adopting the symmetrical USB-KEY technologies. As show in FIG. 2, the flow includes the following blocks.

Block 201: the USB-KEY device initiates an identity authentication request to the server via the Internet.

Block 202: after receiving the request, the server sends a challenge m to the USB-KEY device. The challenge m may include time, session-id and some random numbers.

Block 203: the USB-KEY device utilizes locally stored key and an symmetrical encryption algorithm to encrypt the challenge m so as to obtain the ciphertext c, i.e., c=E(key, m).

Block 204: the USB-KEY device sends the ciphertext c to the server.

Block 205: after receiving the ciphertext c, the server utilizes its key which is the same as that of the USB-KEY device to decrypt c, and to obtain the decrypted plaintext m'=D(key, c).

Block 206: the server compares m with m' to determine whether they are the same, if they are the same as each other, it means that the authentication is successful; otherwise, it means that the authentication is unsuccessful.

Block 207: the server returns a result indicating a successful authentication or an unsuccessful authentication to the USB-KEY device.

Compared with the asymmetrical USB-KEY technologies, the symmetrical encryption algorithms adopted by the symmetrical USB-KEY technologies, such as Data Encryption Standard (DES), Tiny Encryption Algorithm (TES), have lower complexities, which may be implemented with common computing devices. Thus, the cost thereof may be reduced. However, since the key stored in the USB-KEY device is the same as that stored in the server, once the key in the server is leaked, other people may utilize the key to impersonate the authorized user to perform network operations, which may reduce the security greatly.

In the embodiment of the present invention, for the key p0, p1=F(p0) is obtained by performing transformation on p0 with a general transformation function y=F(x), and then p2=H(p1) is obtained by performing transformation on p1 with a unidirectional hash function y=H (x).

The general transformation function y=F(x) therein only needs to ensure that there is one and only one y corresponding to one x, for example, y=x, y=$x^3$, etc.

The features of the unidirectional hash function y=H(x) are as follows, y may be obtained by using x, however x cannot be restored by using y. For example, the commonly used message digest algorithm (MD5), secure hash algorithm (SHA1), etc. For the unidirectional hash function, the case that two different x generate the same y may be referred to as "collision". The above case may be ignored, due to the fact that the probability of collision is very small in practical applications. Therefore, in practical applications, it may be simply considered that once x is different, y is also different.

When a client is accessing to a certain service, e.g., a bank service, the server will store the client's ID. In the embodiment of the present invention, the client and server may predetermine p0, the general transformation function, the hash function, p2, the encryption and decryption functions, etc. in which information about the key p0, the general transformation function, the hash function, the symmetrical encryption function, etc. is stored in the client, information about the key p2, the hash function, the symmetrical decryption function, etc. is stored in the server corresponding to the client's ID.

Figure 3:
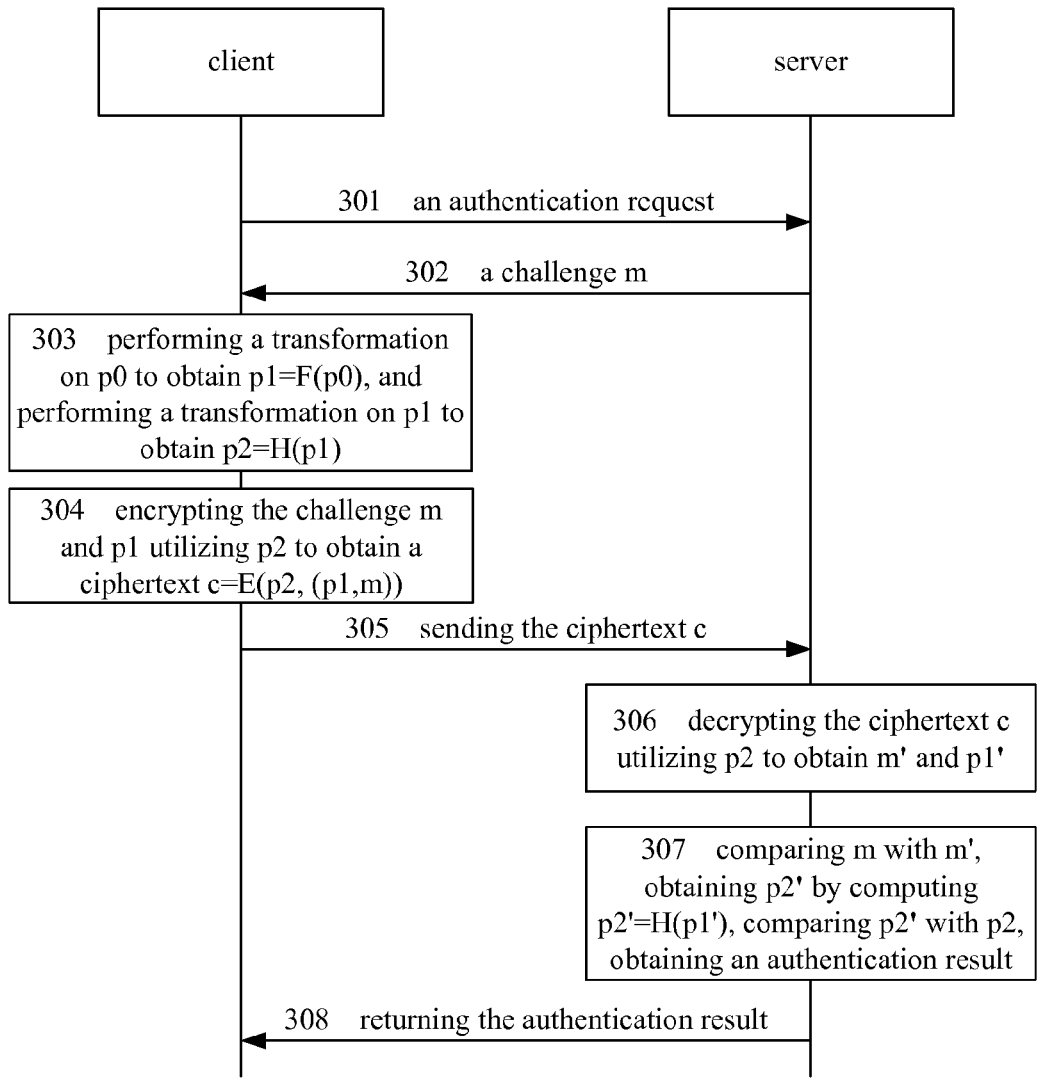
FIG. 3 is a schematic diagram illustrating flow of authentication interaction in accordance with an embodiment of the present invention.

FIG. 3 is a schematic diagram illustrating flow of an embodiment in the present invention. With reference to FIG. 3, the flow in the embodiment of the present invention includes the following blocks.

Block 301: a client initiates an identity authentication request to a server via the Internet. The request carries the client's ID.

Block 302: after receiving the request, the server sends a challenge m to the client, and records the challenge m corresponding to the client's ID. The challenge m may include time, SESSION-ID and some random numbers.

Block 303: the client utilizes a general function y=F(x) to perform transformation on locally stored p0 to obtain p1=F(p0), and then utilizes a hash function y=H(x) to perform transformation on p1 to obtain p2'=H(p1).

Block 304: the client utilizes p2' as key, and adopts a symmetrical encryption algorithm to encrypt m and p1, such that the ciphertext c=E(p2',(p1, m)) is obtained, in which m may include at least one of the time, the SESSION-ID and the some random numbers.

Block 305: the client sends the ciphertext c to the server.

Block 306: after receiving the ciphertext c, the server finds out the key p2 corresponding to the ID of the client sending the ciphertext, decrypts c using p2 and the symmetrical decryption algorithm. If p2=p2', the decrypted p1' and m' may be obtained after the decryption, that is, (p1',m')=D(p2,c).

Block 307: the server searches for challenge m corresponding to the client's ID, compares m' with m to determine whether they are the same, and utilizes the hash function to perform calculation on p1' to obtain p2", that is, p2" is obtained using the formula, p2"=H(p1'), and compares p2" with p2 to determine whether they are the same.

If m' is the same as m, and p2" is the same as p2, the authentication is successful; otherwise, the authentication is unsuccessful.

Block 308: the server returns to the client a result indicating a successful authentication or an unsuccessful authentication.

Furthermore, the client and the server may predetermine p1 instead of p0. Correspondingly, the client may store p1 instead of p0 in advance. And then, the transformation from p0 to p1 may be left out in the above flow. Thus, computational complexity may be reduced.

Based on the above technical solution in the embodiment of the present invention, if other people have obtained p2 due to the leakage of p2 stored in the server, p1 still cannot be obtained reversely from p2 because of the unidirection of the hash function. Thus, only based on p2, the encryption at the client still cannot be achieved without p0 and p1. Therefore, in the embodiment of the present invention, no security problem may be occurred even if the key in the server has been leaked. Thus, the security may be ensured.

From another aspect, the algorithms need to be implemented at the client are the transformation function F, the hash function H and the symmetrical encryption function E. Because these types of algorithms are very simple, they may be completely implemented within MCU built in USB control chips, and the expensive special chips are no longer necessary. Therefore, the solution in the embodiment of the present invention also greatly reduces hardware costs.

Figure 4:
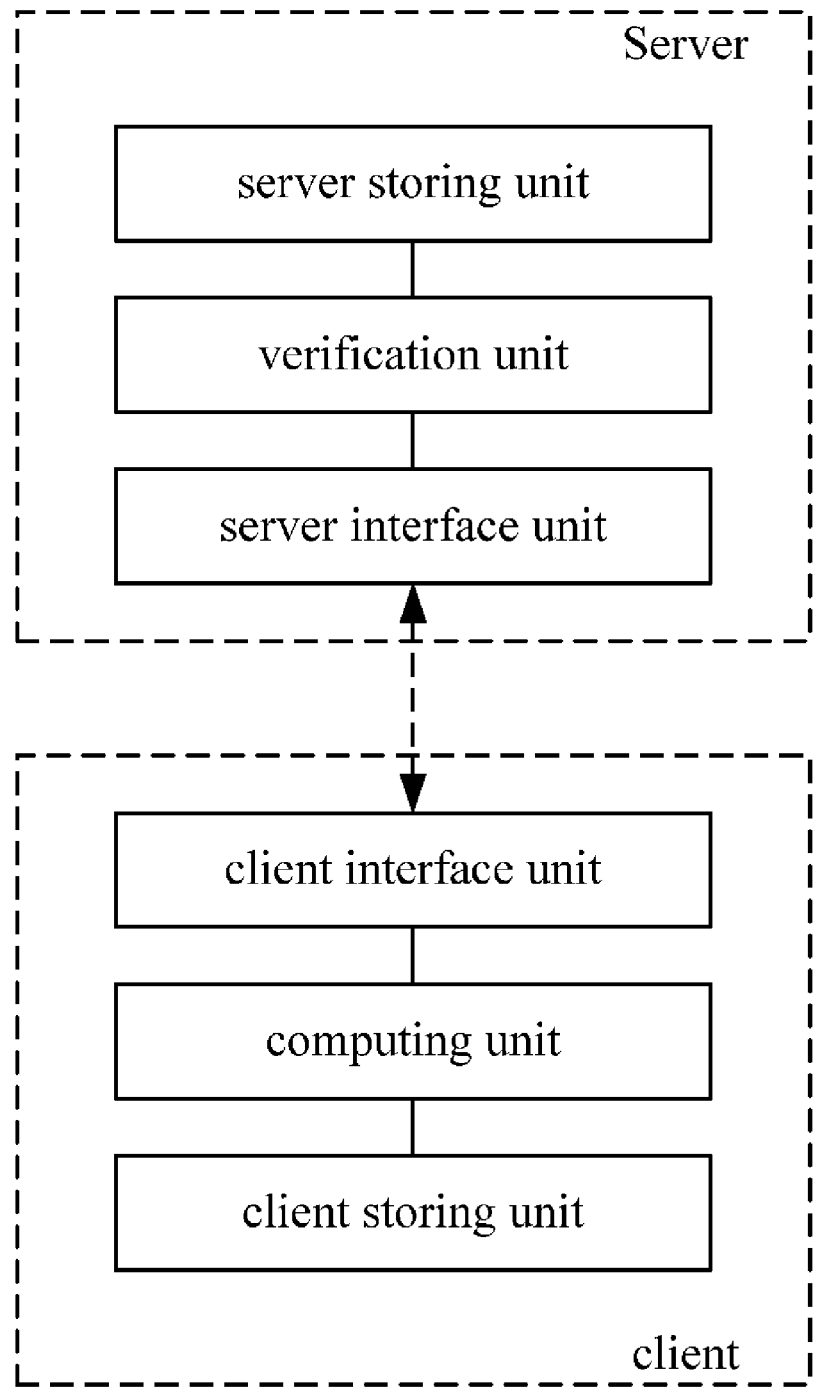
FIG. 4 is a schematic diagram illustrating structure of an authentication system in accordance with an embodiment of the present invention.

FIG. 4 is a schematic diagram illustrating structure of an authentication system in accordance with an embodiment of the present invention.

As shown in FIG. 4, the authentication system in the embodiment of the present invention includes a server and a client. The client is configured to initiate an authentication request to the server, and after receiving the challenge m from the server, utilize a unidirectional hash function y=H(x) to perform transformation on locally stored p1 to obtain p2', utilize p2' to encrypt p1 and the challenge m to obtain ciphertext c, and send the ciphertext c to the server.

The server is configured to send the challenge m to the client after receiving the authentication request, and utilize locally stored p2 to decrypt the ciphertext c after receiving the client's ciphertext c. If p2=p2', the decrypted p1' and challenge m' may be obtained after decryption. The server is further configured to perform transformation on the decrypted p1' with a hash function to obtain p2", compare and determine whether the decrypted challenge m' and p2" obtained by transformation are respectively the same as the sent challenge m and the locally stored p2.

Referring to FIG. 4 continuously, the client includes a client storing unit, a computing unit and a client interface unit. The client storing unit is configured to store p1, the hash function and the encryption function. The computing unit is configured to utilize the hash function to perform transformation on p1 stored in the client storing unit to obtain p2', after receiving the challenge m from the server, utilize p2' to encrypt p1 and the challenge m to obtain the ciphertext c, and send the ciphertext c to the server via the client interface unit. The client interface unit is configured to receive the challenge m and provide the challenge m to the computing unit, and send the ciphertext c to the server.

From another aspect, the client storing unit is configured to store p0, the general transformation function, the hash function and the encryption function. The computing unit is configured to utilize the general transformation function to perform transformation on p0 stored in the client storing unit to obtain p1 after receiving the challenge m from the server, and utilize the hash function to perform transformation on p1 to obtain p2', utilize p2' and the encryption function to encrypt p1 and the challenge m to obtain the ciphertext c, and send the ciphertext c to the server via the client interface unit. The client interface unit is configured to receive the challenge m, provide the challenge m to the computing unit, and send the ciphertext c to the server.

The above-mentioned client is a USB-KEY device, or is a device of other forms, e.g., a computer, a mobile terminal, a Bluetooth Device, etc.

Referring to FIG. 4 continuously, the server includes a server storing unit, a verification unit and a server interface unit. The server storing unit is configured to store p2, the hash function and the decryption function. The verification unit is configured to send the challenge m to the client via the server interface unit, and after receiving the client's ciphertext c, utilize p2 stored in the server storing unit to decrypt the ciphertext c. If p2=p2', the decrypted p1' and challenge m' may be obtained after decryption. And then the verification unit is configured to utilize the hash function to perform transformation on the decrypted p1' to obtain p2", compare and determine whether the decrypted challenge m' and p2" obtained by transformation are respectively the same as the sent challenge m and p2 in the server storing unit. If they are the same, it means that the authentication is passed, otherwise, it means that the authentication is not passed. The verification unit may further send the authentication result to the client via the server interface unit. The server interface unit is configured to receive the ciphertext from the client, provide the ciphertext to the verification unit, and send the challenge m to the client.

The foregoing description is only preferred embodiments of the present invention and is not used for limiting the protection scope thereof. Any modifications, equivalent substitutions, improvements, etc. made within the spirit and principle of the present invention, are all included in the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An authentication method, wherein a server stores a second key, the method comprising:
    sending a challenge to a client by the server;
    obtaining a first key by the client;
    performing a transformation on the first key utilizing a local hash function to obtain a third key by the client;
    encrypting the first key and the challenge utilizing the third key to obtain a ciphertext by the client; and
    sending the ciphertext to the server by the client;
    decrypting the ciphertext utilizing the second key stored locally by the server;
    obtaining decrypted first key and decrypted challenge after decrypting the ciphertext, if the second key is the same as the third key by the server;
    performing a transformation on the decrypted first key utilizing a local hash function to obtain a fourth key by the server;
    passing an authentication of the client, if the decrypted challenge and the fourth key are respectively the same as the challenge sent by the server and the second key stored by the server.

2. The method according to claim 1, wherein obtaining the first key by the client comprises:
    storing an initial key by the client;

performing a transformation on the initial key utilizing a general transformation function to obtain the first key by the client.

3. The method according to claim 1, wherein obtaining the first key by the client comprises:
storing the first key locally in advance by the client.

4. The method according to claim 1, wherein the challenge sent by the server to the client comprises at least one of: time, a SESSION-ID, random numbers.

5. The method according to claim 1, wherein the hash function is a message digest algorithm (MD5) or a secure hash algorithm (SHA1).

6. The method according to claim 1, wherein the server stores the second key comprises:
the server stores the second key locally corresponding to an identifier of the client.

7. The method according to claim 6, wherein decrypting the ciphertext utilizing the second key stored locally comprises:
searching for the second key stored locally according to the identifier of the client;
decrypting the ciphertext utilizing the second key.

8. A client which is configured for authentication, comprising:
a first module, including a processor and a memory, configured to receive a challenge sent by a server, and send a ciphertext coming from a third module to the server;
a second module, including a processor and a memory, configured to store a hash function;
a third module, including a processor and a memory, configured to obtain a first key, perform a transformation on the first key utilizing the hash function coming from the second module to obtain a second key, and encrypt the first key and the challenge received by the first module utilizing the second key to obtain the ciphertext.

9. The client according to claim 8, wherein the second module is further configured to store an initial key, and
the third module is further configured to perform a transformation on the initial key coming from the second module utilizing a general transformation function to obtain the first key.

10. The client according to claim 8, wherein the second module is further configured to store the first key; and
the third module is further configured to obtain the first key from the second module.

11. The client according to any one of claims 8, wherein the client comprises a USB-KEY device.

12. The client according to claim 9, wherein the client comprises a USB-KEY device.

13. The client according to claim 10, wherein the client comprises a USB-KEY device.

14. A server which is configured for authentication, comprising:
a first module, including a processor and a memory, configured to send a challenge to a client, and receive a ciphertext sent by the client;
a second module, including a processor and a memory, configured to store a first key and a hash function;
a third module, including a processor and a memory, configured to decrypt the ciphertext received by the first module utilizing the first key stored by the second module, obtain a decrypted third key and a decrypted challenge if the first key is the same as a second key adopted to encrypt the ciphertext in the client, perform a transformation on the third key utilizing the hash function to obtain a fourth key, determine the client has passed the authentication if the decrypted challenge and the fourth key are respectively the same as the challenge sent by the first module and the first key stored by the second module.

15. An authentication system, comprising a server and a client, wherein
the client obtaining a first key, performing a transformation on the first key utilizing a locally stored hash function to obtain a second key after receiving a challenge sent by the server, encrypting the first key and the challenge utilizing the second key to obtain a ciphertext, and send the ciphertext to the server;
the server is configured to store a third key, send the challenge to the client, decrypt the ciphertext utilizing the third key stored locally after receiving the ciphertext from the client, obtain a decrypted first key and a decrypted challenge if the third key is the same as the second key, perform a transformation on the decrypted first key utilizing a local hash function to obtain a fourth key, determine the client has passed an authentication if the decrypted challenge and the fourth key are respectively the same as the challenge sent by the server and the third key stored locally by the server.

* * * * *